(12) United States Patent
Jin (10) Patent No.: US 11,614,235 B2
(45) Date of Patent: *Mar. 28, 2023

(54) COMBUSTOR AND GAS TURBINE INCLUDING THE SAME

(71) Applicant: DOOSAN ENERBILITY CO., LTD, Changwon-si (KR)

(72) Inventor: Heonseop Jin, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,023

(22) Filed: Jun. 21, 2021

(65) Prior Publication Data

US 2021/0310658 A1    Oct. 7, 2021

Related U.S. Application Data

(63) Continuation of application No. 16/132,466, filed on Sep. 17, 2018, now Pat. No. 11,085,647.

(30) Foreign Application Priority Data

Oct. 13, 2017  (KR) .......................... 10-2017-0133171

(51) Int. Cl.
*F23R 3/60* (2006.01)
*F01D 9/02* (2006.01)
(Continued)

(52) U.S. Cl.
CPC ................ *F23R 3/60* (2013.01); *F01D 9/023* (2013.01); *F02C 3/14* (2013.01); *F23R 3/46* (2013.01); *F05D 2240/35* (2013.01); *F05D 2260/941* (2013.01); *F23R 2900/00005* (2013.01); *F23R 2900/00012* (2013.01)

(58) Field of Classification Search
CPC ........................................................ F23R 3/002
See application file for complete search history.

(56) References Cited

U.S. PATENT DOCUMENTS

| 2,592,060 A | * | 4/1952 | Oulianoff | ................ | F01D 9/023 |
| | | | | | 285/332.1 |
| 2010/0307166 A1 | * | 12/2010 | Woodcock | .............. | F01D 9/023 |
| | | | | | 60/755 |

(Continued)

*Primary Examiner* — Ehud Gartenberg
*Assistant Examiner* — Jacek Lisowski
(74) *Attorney, Agent, or Firm* — Harvest IP Law LLP (57) ABSTRACT

A combustor includes a liner having an outlet end to pass combustion gas and a liner flange protruding outward from the outlet end; a transition piece to discharge combustion gas from the liner to a turbine, the transition piece having an inlet end for coupling to the outlet end of the liner and a transition piece flange protruding outward from the inlet end to face the liner flange; and a first elastic support installed on the liner flange to protrude toward the transition piece flange. A force applied from the transition piece elastically deforms an elastic arch of the first elastic support, which includes a movable support that is spaced apart from the liner flange if the force applied from the transition piece does not primarily deform the elastic arch. An auxiliary elastic support installed inside the first elastic support elastically deforms if the force secondarily deforms the elastic arch.

8 Claims, 6 Drawing Sheets

(51) Int. Cl.
   *F02C 3/14*      (2006.01)
   *F23R 3/46*      (2006.01)

(56) References Cited

U.S. PATENT DOCUMENTS

| | | | |
|---|---|---|---|
| 2011/0179798 A1* | 7/2011 | Pieussergues | F02C 7/28 |
| | | | 277/650 |
| 2012/0321450 A1* | 12/2012 | Aschenbruck | F01D 11/003 |
| | | | 415/174.2 |
| 2013/0042631 A1* | 2/2013 | Jadhav | F16J 15/061 |
| | | | 60/800 |
| 2013/0174558 A1* | 7/2013 | Stryapunin | F23R 3/34 |
| | | | 60/734 |
| 2014/0250893 A1* | 9/2014 | Chan | F23R 3/007 |
| | | | 403/30 |
| 2016/0356496 A1* | 12/2016 | Thackway | F23R 3/002 |
| 2017/0028516 A1* | 2/2017 | Klejc | F23R 3/002 |
| 2017/0059160 A1* | 3/2017 | Bloom | F23R 3/60 |
| 2017/0082062 A1* | 3/2017 | Ruthemeyer | F01D 25/246 |
| 2017/0241280 A1* | 8/2017 | Ponchak | F01D 11/003 |
| 2018/0087390 A1* | 3/2018 | Morgan | F01D 9/023 |

\* cited by examiner

COMBUSTOR AND GAS TURBINE INCLUDING THE SAME

CROSS-REFERENCE TO RELATED APPLICATIONS

This is a Divisional Application of U.S. application Ser. No. 16/132,466 filed Sep. 17, 2018 which claims priority to Korean Patent Application No. 10-2017-0133171, filed on Oct. 13, 2017, the disclosure of which is incorporated herein by reference in its entirety.

BACKGROUND OF THE DISCLOSURE

Field of the Disclosure

Exemplary embodiments of the present disclosure relate to a combustor and a gas turbine including the combustor.

Description of the Related Art

A gas turbine is a power engine configured to mix fuel with air compressed by a combustor, combust the mixture of the fuel and the compressed air, and rotate a turbine using high-temperature gas generated by the combustion. Gas turbines are used to drive a generator, an aircraft, a vessel, a train, and so forth.

Generally, gas turbines include a compressor, a combustor, and a turbine. The compressor draws external air, compresses the air, and then transmits it to the combustor. Air compressed by the compressor enters a high-pressure and high-temperature state. The combustor mixes fuel with compressed air supplied from the compressor, and combusts the mixture of the fuel and the compressed air. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

RELATED DOCUMENT

[Patent Document]
Korean Patent Registration No. 10-1760736

SUMMARY OF THE DISCLOSURE

An object of the present disclosure is to provide a combustor having a structure capable of stably supporting a junction between a liner and a transition piece, and a gas turbine including the combustor.

In accordance with one aspect of the present disclosure, a combustor may include a liner forming an internal space for combusting a mixture of fuel and compressed air ejected from a combustion nozzle, the liner having an outlet end configured to pass combustion gas and a liner flange protruding outward from the outlet end; a transition piece configured to discharge the combustion gas from the liner to a turbine, the transition piece having an inlet end for coupling to the outlet end of the liner and a transition piece flange protruding outward from the inlet end to face the liner flange; and a first elastic support installed on the liner flange to protrude toward the transition piece flange and configured to elastically support the transition piece.

The first elastic support may include a fixed base having one side fixed to the liner flange and including a first bend protruding toward the transition piece flange; and an elastic arch having a first edge extending from the first bend of the fixed base, the elastic arch configured to elastically deform by a force applied from the transition piece.

The elastic arch may include a second edge formed opposite to the first edge and a second bend extending from the second edge toward the first edge, and the first elastic support may further include a movable support extending from the second bend and having a surface facing the liner flange. The surface of the movable support may be spaced apart from the liner flange if the force applied from the transition piece does not primarily deform the elastic arch. The combustor may further include an auxiliary elastic support installed on the liner flange inside the first elastic support, wherein the auxiliary elastic support is elastically deformed if the force applied from the transition piece secondarily deforms the elastic arch.

The first elastic support may include a front ridge facing the transition piece flange; and a sealing protrusion protruding from the front ridge toward the transition piece flange. The transition piece flange may include a seating groove for receiving the sealing protrusion. The sealing protrusion may include a sealing arch having a thickness less than a thickness of the elastic arch.

The combustor may further include a second elastic support installed on the transition piece flange to protrude toward the liner flange and configured to contact the first elastic support. The first elastic support and the second elastic support may be coupled to each other by one of the first and second elastic supports being fitted to the other of the first and second elastic supports. The combustor may further include a sealing protrusion protruding from the first elastic support toward the second elastic support; and a support groove formed in the second elastic support for receiving the sealing protrusion.

The first elastic support may include a leaf spring.

The combustor may further include an auxiliary elastic support including a leaf spring installed on the liner flange inside the first elastic support, and the auxiliary elastic support and the first elastic support respectively may have different spring constants. The spring constant of the auxiliary elastic support may be 1.1 to 5 times the spring constant of the first elastic support.

The combustor may further include a guide member installed on the liner and configured to support the transition piece by contacting an inner circumferential surface of the transition piece. The guide member may include a guide rod having one end fixed to an inner circumferential surface of the liner and extending into an internal space of the transition piece, and a guide roller rotatably coupled to the guide rod and configured to contact the inner circumferential surface of the transition piece.

The liner flange may include a liner flange facing surface that faces the transition piece flange and is substantially perpendicular to an outer circumferential surface of the liner; and a liner flange flow guide surface that is disposed opposite to the liner flange facing surface and is inclined with respect to the outer circumferential surface of the liner in order to guide a flow of fluid moving along the outer circumferential surface of the liner. Meanwhile, the transition piece flange may include a transition piece flange facing surface that faces the liner flange and is substantially perpendicular to an outer circumferential surface of the transition piece; and a transition piece flange flow guide surface that is disposed opposite to the transition piece flange facing surface and is inclined with respect to the outer circumferential surface of the transition piece in order to guide a flow of fluid moving along the outer circumferential surface of the transition piece.

In accordance with another aspect of the present disclosure, a combustor may include the above liner; the above transition piece; and a second elastic support installed on the transition piece flange to protrude toward the liner flange and configured to elastically support the liner.

In accordance with another aspect of the present disclosure, there is provide a gas turbine including a compressor configured to compress air drawn from an outside, a combustor configured to mix fuel with the compressed air and to produce combustion gas by combusting the fuel-air mixture, and a turbine configured to be rotated by the combustion gas. The combustor of the gas turbine is consistent with the above-described combustor.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Since the present disclosure may be modified in various forms, and may have various embodiments, preferred embodiments will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, preferred embodiments of the present disclosure will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Hereinafter, a gas turbine in accordance with a first embodiment of the present disclosure will be described.

Figure 1:
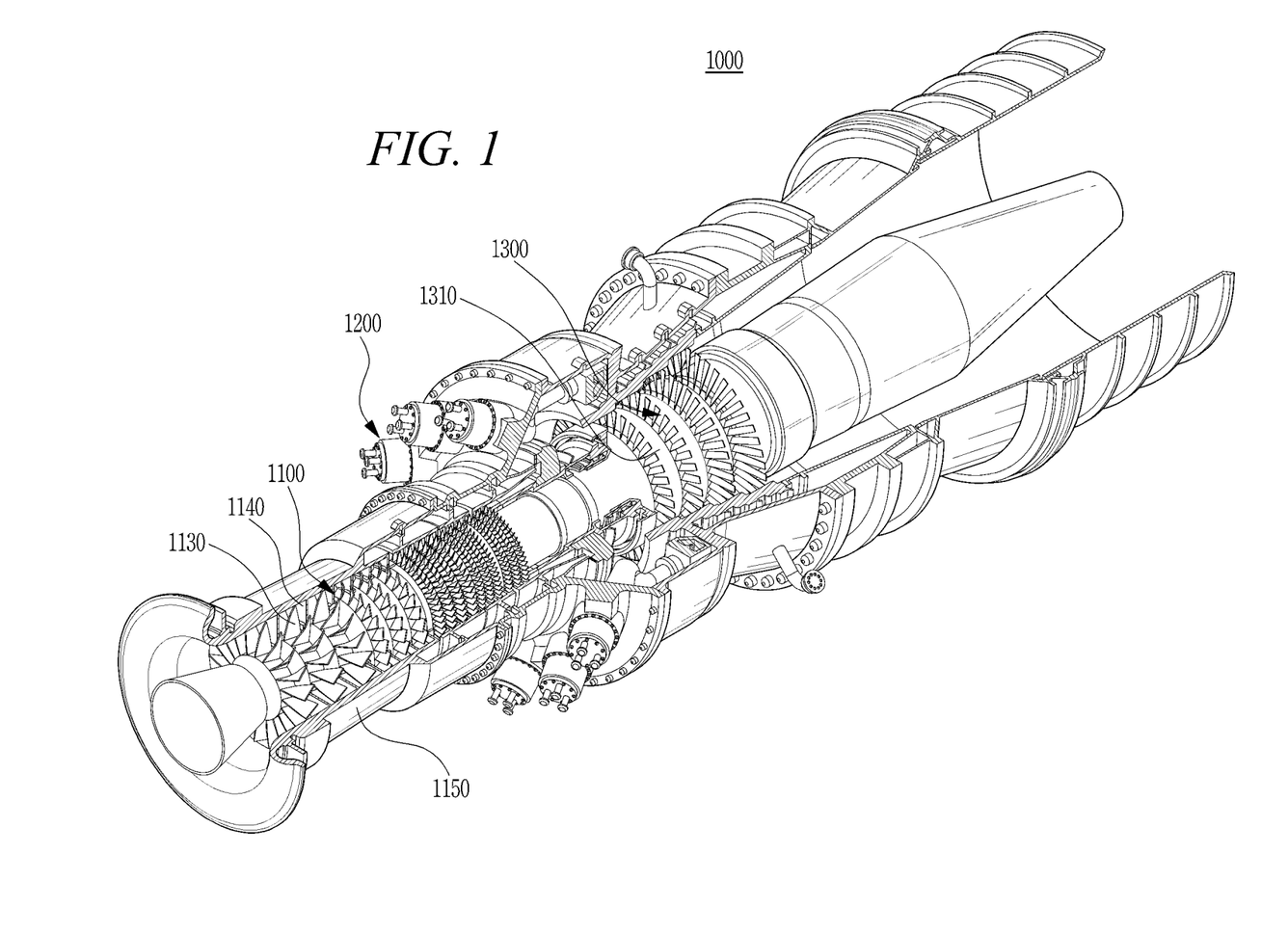
FIG. 1 is a cutaway perspective view of a gas turbine in accordance with a first embodiment of the present disclosure.
Figure 2:
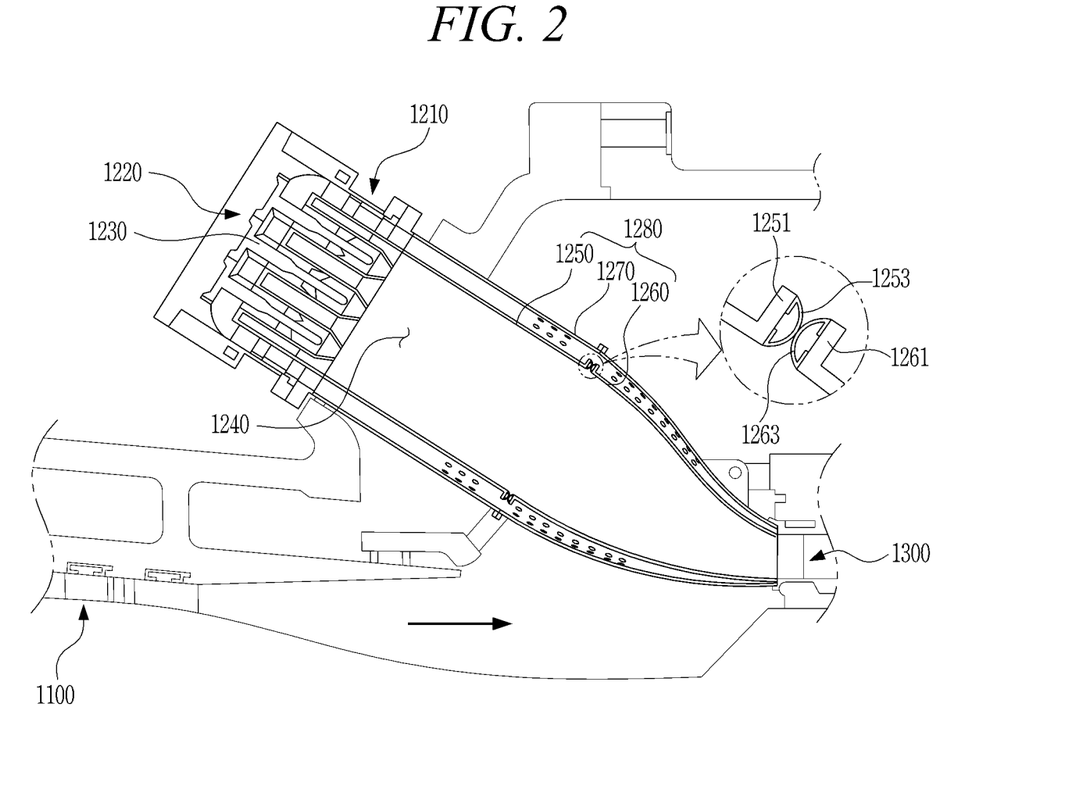
FIG. 2 is a sectional view of a combustor of FIG. 1.

FIG. 1 illustrates an internal structure of a gas turbine in accordance with an embodiment of the present disclosure, and FIG. 2 illustrates a combustor of FIG. 1.

The thermodynamic cycle of the gas turbine 1000 according to the present embodiment ideally complies with the Brayton cycle. The Brayton cycle may consist of four processes including an isentropic compression (adiabatic compression) process, an isobaric heat supply process, an isentropic expansion (adiabatic expansion) process, and an isobaric heat rejection process. In other words, the gas turbine may draw air from the atmosphere, compress the air, combust fuel under isobaric conditions to emit energy, expand this high-temperature combustion gas to convert the thermal energy of the combustion gas into kinetic energy, and thereafter discharge exhaust gas with residual energy to the atmosphere. As such, the Brayton cycle may consist of four processes including compression, heat addition, expansion, and heat rejection.

Embodying the Brayton cycle, the gas turbine 1000 may include a compressor 1100, a combustor 1200, and a turbine 1300, as shown in FIG. 1. Although the following description will be made with reference to FIG. 1, the description of the present disclosure may also be widely applied to a turbine engine having the same configuration as that of the gas turbine 1000.

Referring to FIG. 1, the compressor 1100 of the gas turbine 1000 may draw air from the outside and compress the air. The compressor 1100 may supply air compressed by compressor blades 1130 to the combustor 1200 and also supply air for cooling to a high-temperature area needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. Generally, the centrifugal compressor is used in a small gas turbine. On the other hand, in a large gas turbine such as the gas turbine 1000 shown in FIG. 1, a multi-stage axial compressor 1100 is generally used so as to compress a large amount of air. Here, in the multi-stage axial compressor 1100, the blades 1130 of the compressor 1100 rotate along with rotation of a rotor disk, compress drawn air, and transfer compressed air to vanes 1140 disposed at the following stage. Air is compressed gradually to high pressures while passing through the blades 1130 formed in a multi-stage structure.

The vanes 1140 may be mounted to an inner surface of the housing 1150 in such a way that a plurality of vanes 1140 form each stage. The vanes 1140 guide compressed air transferred from the compressor blades 1130 disposed at the preceding stage, toward the compressor blades 1130 disposed at the following stage. In an embodiment, at least some of the plurality of vanes 1140 may be mounted so as to be rotatable within a predetermined range, e.g., to adjust the flow rate of air.

The compressor 1100 may be operated using some of the power output from the turbine 1300. To this end, as shown in FIG. 1, a rotating shaft of the compressor 1100 may be directly coupled with a rotating shaft of the turbine 1300. In the case of the large gas turbine 1000, almost half of the output produced by the turbine 1300 may be consumed to drive the compressor 1100. Therefore, improvement in efficiency of the compressor 1100 may have a direct effect on increasing the overall efficiency of the gas turbine 1000.

The combustor 1200 may mix fuel with compressed air supplied from an outlet of the compressor 1100 and combust the mixture through an isobaric combustion process to make combustion gas having high energy. FIG. 2 illustrates an example of the combustor 1200 applied to the gas turbine 1000. The combustor 1200 may include a combustor casing 1210, a plurality of burners 1220, a combustion nozzle 1230, a liner 1250, a transition piece 1260, a flow sleeve 1270, a first elastic support 1253, and a second elastic support 1263.

The combustor casing 1210 may enclose the plurality of burners 1220 and have approximately a cylindrical shape. The burners 1220 may be disposed at a downstream side of the compressor 1100 and arranged along a combustor casing 1210 having an annular shape. A plurality of combustion nozzles 1230 are provided in each burner 1220. Fuel ejected from the combustion nozzles 1230 is mixed with air at an appropriate ratio to form a mixture having conditions suitable for combustion.

In the gas turbine 1000, gas fuel, liquid fuel, or hybrid fuel formed by a combination of them may be used. It is important to form combustion conditions for reducing the amount of exhaust gas such as carbon monoxide and nitrogen oxide, which should be regulated by law. Recently, use of pre-mixed combustion has increased because a combustion temperature can be reduced and uniform combustion is possible so that exhaust gas can be reduced, although it is difficult to control the pre-combustion.

In the case of the pre-mixed combustion, compressed air is mixed with fuel ejected in advance from the combustion nozzles 1230, and then enters the combustion chamber 1240. Initial ignition of pre-mixed gas is performed by an igniter. Thereafter, if combustion is stabilized, fuel and air are supplied so that the combustion is maintained.

Referring to FIG. 2, compressed air flows along an outer surface of a duct assembly 1280, which is coupled between the burner 1220 and the turbine 1300 so that high-temperature combustion gas can flow through the duct assembly, and then is supplied toward the combustion nozzles 1230. During this process, the duct assembly 1280 heated by high-temperature combustion gas may be appropriately cooled.

The duct assembly 1280 may include the liner 1250, the transition piece 1260, and the flow sleeve 1270. The duct assembly 1280 has a double-shell structure, in which the flow sleeve 1270 encloses the outer surfaces of the liner 1250 and the transition piece 1260 that are coupled to each other. Compressed air enters an annular space defined in the flow sleeve 1270 and cools the liner 1250 and the transition piece 1260.

The liner 1250 is a tube-like member coupled to the burners 1220 of the combustor 1200, and an internal space of the liner 1250 forms the combustion chamber 1240. The liner 1250 has an outlet end configured to pass the high-temperature combustion gas from the combustion chamber 1240. The transition piece 1260 coupled with the liner 1250 is coupled to an inlet of the turbine 1300 and functions to guide the high-temperature combustion gas into the turbine 1300. That is, the transition piece 1260 is configured to discharge the combustion gas from the liner 1250 to the turbine 1300 and has an inlet end for coupling to the outlet end of the liner 1250. The flow sleeve 1270 functions to protect the liner 1250 and the transition piece 1260 and prevent high-temperature heat from being directly emitted to the outside.

Particularly, because the liner 1250 and the transition piece 1260 come into direct contact with high-temperature combustion gas, it is essential to appropriately cool the liner 1250 and the transition piece 1260. Basically, the liner 1250 and the transition piece 1260 are protected from high-temperature combustion gas in a film cooling manner using compressed air.

Since the liner 1250 and the transition piece 1260 each have an end fixed to one of the combustor 1200 and the turbine 1300, respectively, a displacement due to thermal expansion may occur at the junction between the liner 1250 and the transition piece 1260.

Figure 3:
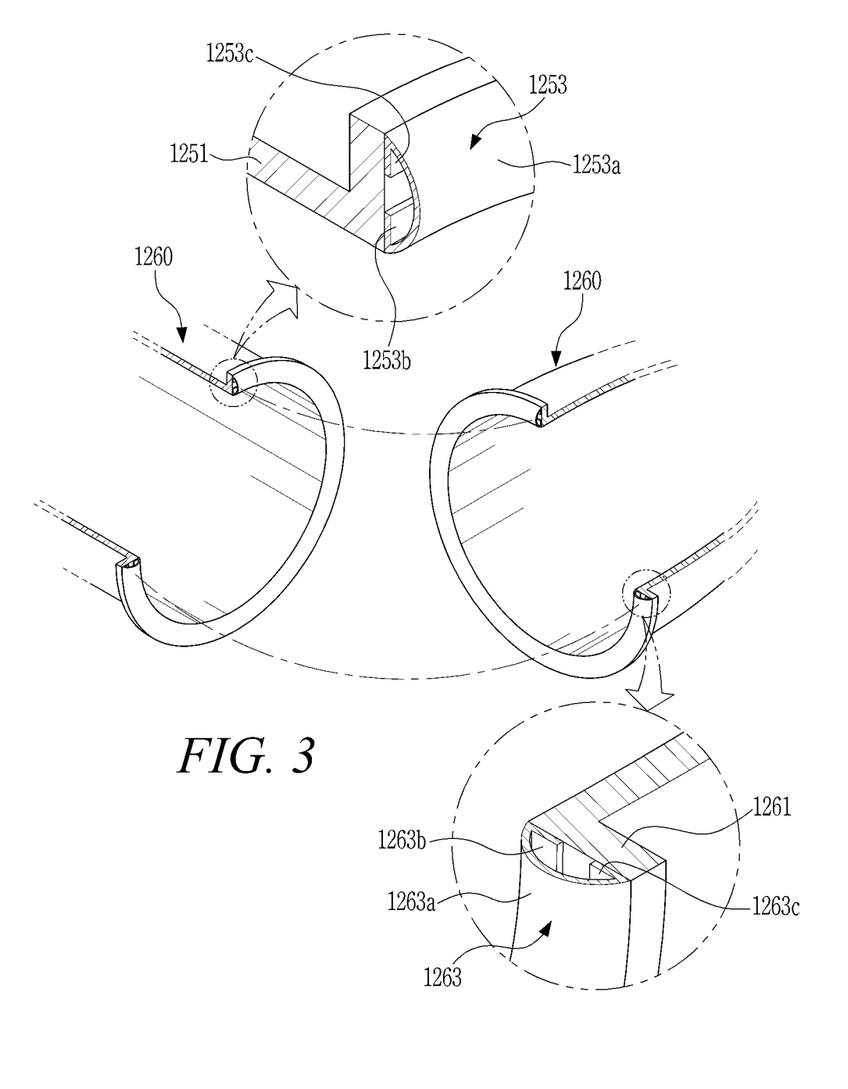
FIG. 3 is an exploded perspective view of a liner and a transition piece in accordance with the first embodiment of the present disclosure.

The liner 1250 includes a liner flange 1251 protruding outward. The liner flange 1251 is formed on a longitudinal end of the liner 1250. The liner flange 1251 extends along a circumferential direction of the liner 1250 and thus has an annular shape. The transition piece 1260 includes a transition piece flange 1261 protruding outward. The transition piece flange 1261 is formed on a longitudinal end of the transition piece 1260. The transition piece flange 1261 extends along a circumferential direction of the transition piece 1260 and thus has an annular shape.

The liner flange 1251 and the transition piece flange 1261 are disposed facing each other. To this end, the liner flange 1251 and the transition piece flange 1261 may have the same diameter. The first elastic support 1253 and the second elastic support 1263 are installed between the liner flange 1251 and the transition piece flange 1261.

The first elastic support 1253 may be fixed to the liner flange 1251 and formed of a leaf spring. When the liner 1250 and the transition piece 1260 thermally expand, the first elastic support 1253 is elastically deformed to support the liner 1250 and the transition piece 1260. For this, the first elastic support 1253 may include an elastic arch 1253a that has a curved or arc-shaped outer surface, and two fixed bases 1253b and 1253c which are bent from respective opposite side edges of the elastic arch 1253a and fixed to the liner flange 1251.

The elastic arch 1253a may be formed of a curved surface, and each of the fixed bases 1253b and 1253c may be formed of a planar surface. Each of the fixed bases 1253b and 1253c may be fixed to the liner flange 1251 by means of a screw, a bolt, a weld, etc. The first elastic support 1253 may extend in the circumferential direction of the liner flange 1251 and thus have an annular shape.

The second elastic support 1263 may be brought into contact with the first elastic support 1253 and be fixed to the transition piece flange 1261. The second elastic support 1263 may be formed of a leaf spring. When the liner 1250 and the transition piece 1260 thermally expand, the second elastic support 1263 is elastically deformed to support the liner 1250 and the transition piece 1260. For this, the second elastic support 1263 may include an elastic arch 1263a curved in an arc shape, and two fixed bases 1263b and 1263c which are bent from respective opposite side edges of the elastic arch 1263a and fixed to the transition piece flange 1261.

The elastic arch 1263a may be formed of a curved surface, and each of the fixed bases 1263b and 1263c may be formed of a planar surface. The fixed bases 1263b and 1263c may be fixed to the transition piece flange 1261 by welding or the like. The second elastic support 1263 may extend in the circumferential direction of the transition piece flange 1261 and thus have an annular shape.

The first elastic support 1253 and the second elastic support 1263 are formed to have the same diameter. A front ridge of the elastic arch 1253a of the first elastic support 1253 comes into contact with a front ridge of the elastic arch 1263a of the second elastic support 1263. In this way, the first elastic support 1253 and the second elastic support 1263 may be installed in such a way that convex portions of the first and second elastic supports 1253 and 1263 are brought into contact with each other and are compressed by each other.

As described in the first embodiment of the present disclosure, in the case where the first elastic support 1253 is installed on the liner flange 1251 and the second elastic support 1263 is installed on the transition piece flange 1261, when the liner 1250 and the transition piece 1260 thermally expand, the first and second elastic supports 1253 and 1263 contract and thus stably support the liner 1250 and the transition piece 1260.

In the conventional art, the liner and the transition piece are coupled to each other in a fitting manner and partially overlapped with each other, and an elastic member is installed making contact with an outer circumferential surface of the liner and an inner circumferential surface of the transition piece. However, in the conventional structure, when thermal expansion and contraction of the liner and the transition piece are repeated, the elastic member may be damaged by friction between the elastic member and the transition piece, or the lifetime of the elastic member may be reduced.

However, in accordance with the first embodiment of the present disclosure, the first elastic support 1253 and the second elastic support 1263 come into contact with each other such that they are compressed by each other. Thus, under normal conditions, the first and second elastic supports 1253 and 1263 may support the liner 1250 and the transition piece 1260. When the liner 1250 and the transition piece 1260 thermally expand, the first and second elastic supports 1253 and 1263 are elastically contracted and deformed, and thus are able to support the liner 1250 and the transition piece 1260. Furthermore, if heat is removed, the first elastic support 1253 and the second elastic support 1263 expand again, thus supporting the liner 1250 and the transition piece 1260.

Hereinafter, a gas turbine in accordance with a second embodiment of the present disclosure will be described.

Figure 4:
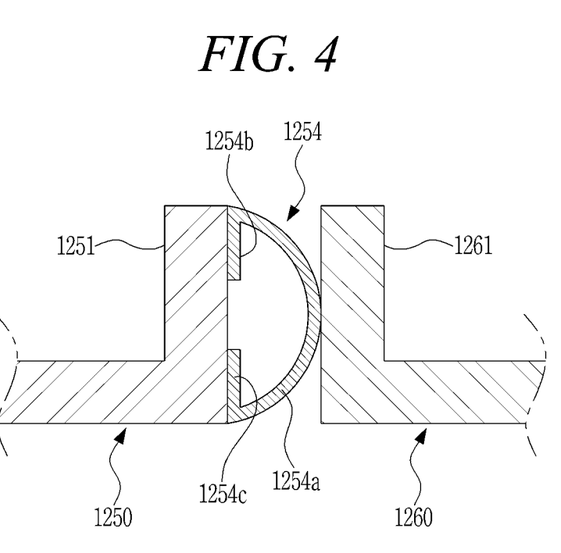
FIGS. 4-9 are sectional views of a junction between a liner flange and a transition piece flange in accordance with second through seventh embodiments of the present disclosure, respectively.

FIG. 4 illustrates a portion of a liner and a portion of a transition piece in accordance with the second embodiment of the present disclosure.

Referring to FIG. 4, the gas turbine in accordance with the second embodiment of the present disclosure has primarily the same structure as that of the gas turbine in accordance with the first embodiment described above and differs in the application of a first elastic support 1254. Therefore, repetitive explanation of corresponding structure will be omitted.

The first elastic support 1254 is installed between the liner flange 1251 and the transition piece flange 1261 to elastically support the liner 1250 and the transition piece 1260.

The first elastic support 1254 may be fixed to the liner flange 1251 and formed of a leaf spring. When the liner 1250 and the transition piece 1260 thermally expand, the first elastic support 1254 is elastically deformed to support the liner 1250 and the transition piece 1260. For this, the first elastic support 1254 may include an elastic arch 1254*a* curved in an arc shape, and two fixed bases 1254*b* and 1254*c* which are bent from respective opposite side edges of the elastic arch 1254*a* and fixed to the liner flange 1251.

The elastic arch 1254*a* may be formed of a curved surface, and each of the fixed bases 1254*b* and 1254*c* may be formed of a planar surface. The fixed bases 1254*b* and 1254*c* may be fixed to the liner flange 1251 by welding. The first elastic support 1254 may extend in the circumferential direction of the liner flange 1251 and thus have an annular shape.

According to the third embodiment having the above-mentioned configuration, the liner 1250 and the transition piece 1260 may be stably supported by the single first elastic support 1254 installed on the liner flange 1251.

Hereinafter, a gas turbine in accordance with a third embodiment of the present disclosure will be described.

Figure 5:
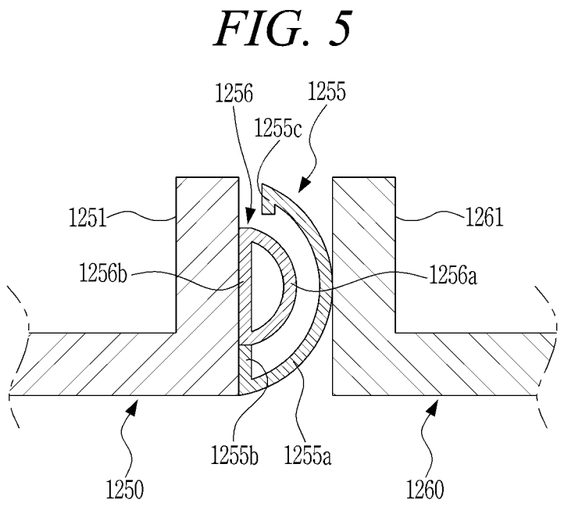

FIG. 5 illustrates a portion of a liner and a portion of a transition piece in accordance with the third embodiment of the present disclosure.

Referring to FIG. 5, the gas turbine in accordance with the third embodiment of the present disclosure has primarily the same structure as that of the gas turbine in accordance with the first embodiment described above and differs in the application of a first elastic support 1255 and an auxiliary elastic support 1256. Therefore, repetitive explanation of corresponding structure will be omitted.

The combustor in accordance with the third embodiment includes the first elastic support 1255 and the auxiliary elastic support 1256. The first elastic support 1255 is installed between the liner flange 1251 and the transition piece flange 1261 to elastically support the liner 1250 and the transition piece 1260.

The first elastic support 1255 may be fixed to the liner flange 1251 and formed of a leaf spring. When the liner 1250 and the transition piece 1260 thermally expand, the first elastic support 1255 is elastically deformed to support the liner 1250 and the transition piece 1260. For this, the first elastic support 1255 may include an elastic arch 1255*a* curved in an arc shape, a fixed base 1255*b* which is bent from one side edge of the elastic arch 1255*a* and fixed to the liner flange 1251, and a movable support 1255*c* bent from the other side edge of the elastic arch 1255*a*.

The first elastic support 1255 may extend in the circumferential direction of the liner flange 1251 and thus have an annular shape. The elastic arch 1255*a* may be formed of a curved surface, and the fixed base 1255*b* and the movable support 1255*c* each may be formed of a planar surface. The fixed base 1255*b* may be formed of a flat plate and fixed to the liner flange 1251 by welding or the like. The movable support 1255*c* may be formed of a flat plate and disposed facing the liner flange 1251 at a position spaced apart from the liner flange 1251. Hence, the movable support 1255*c* acts as a free end.

The auxiliary elastic support 1256 may be formed of a leaf spring, and include an elastic arch 1256*a* formed in an arc shape, and a fixed part 1256*b* formed of a plate coupled to opposite side edges of the elastic arch 1256*a*. The elastic arch 1256*a* may be formed of a curved plate, and the fixed part 1256*b* may be formed of a flat plate. Furthermore, the fixed part 1256*b* may be fixed to the liner flange 1251 by means of a screw, a bolt, a weld, etc.

The auxiliary elastic support 1256 has a spring constant different from that of the first elastic support 1255. The spring constant of the auxiliary elastic support 1256 may be greater than the spring constant of the first elastic support 1255. Furthermore, the spring constant of the auxiliary elastic support 1256 may be 1.1 times to 5 times the spring constant of the first elastic support 1255. If the spring constant of the auxiliary elastic support 1256 is within the above-mentioned range, the liner 1250 and the transition piece 1260 may be stably supported.

Hereinafter, the effect of the first elastic support 1255 and the auxiliary elastic support 1256 in accordance with the third embodiment will be described.

If the liner 1250 and the transition piece 1260 thermally expand, the elastic arch 1255*a* is primarily deformed, so that the movable support 1255*c* may come into contact with the liner flange 1251. Thereafter, if the liner 1250 and the transition piece 1260 further expand, the elastic arch 1255*a* is secondarily deformed, whereby the elastic arch 1255*a* of the first elastic support 1255 comes into contact with the auxiliary elastic support 1256. If the liner 1250 and the transition piece 1260 further expand, the first elastic support 1255 and the auxiliary elastic support 1256 together tertiarily support the liner 1250 and the transition piece 1260.

As described above, in accordance with the third embodiment, since the first elastic support 1255 and the auxiliary elastic support 1256 are installed, the first elastic support 1255 and the auxiliary elastic support 1256 may reliably support the liner 1250 and the transition piece 1260 while being deformed in three stages.

Hereinafter, a gas turbine in accordance with a fourth embodiment of the present disclosure will be described.

Figure 6:
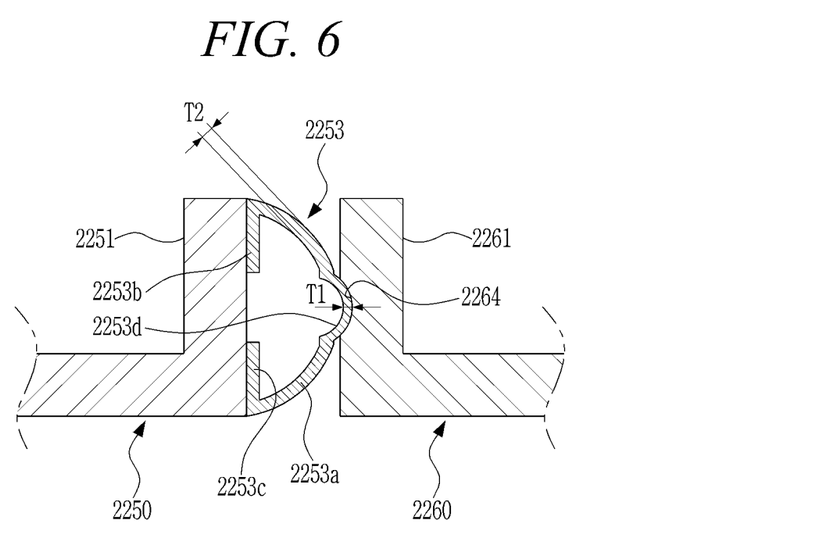

FIG. 6 illustrates a portion of a liner and a portion of a transition piece in accordance with the fourth embodiment of the present disclosure.

Referring to FIG. 6, the gas turbine in accordance with the fourth embodiment of the present disclosure has primarily the same structure as that of the gas turbine in accordance with the first embodiment described above and differs in the application of a first elastic support 2253. Therefore, repetitive explanation of corresponding structure will be omitted.

The first elastic support 2253 is installed between the liner flange 2251 and the transition piece flange 2261 to elastically support the liner 2250 and the transition piece 2260.

The first elastic support 2253 may be fixed to the liner flange 2251 and formed of a leaf spring. Furthermore, the first elastic support 2253 may extend in the circumferential direction of the liner flange 2251 and thus have an annular shape.

When the liner 2250 and the transition piece 2260 thermally expand, the first elastic support 2253 is elastically deformed to support the liner 2250 and the transition piece 2260. For this, the first elastic support 2253 may include an elastic arch 2253*a* curved in an arc shape, two fixed bases 2253*b* and 2253*c* which are bent from respective opposite side edges of the elastic arch 2253*a* and fixed to the liner flange 2251, and a sealing protrusion 2253*d* protruding from the elastic arch 2253*a*.

The elastic arch 2253*a* may be formed of a curved surface, and each of the fixed bases 2253*b* and 2253*c* may be formed of a planar surface. The fixed bases 2253*b* and 2253*c* may be fixed to the liner flange 2251 by welding. The sealing protrusion 2253*d* protrudes from the elastic arch 2253*a* toward the transition piece flange 2261, and includes a sealing arch that is formed of a curved, convex protrusion and is designed so as to be elastically deformable.

The sealing protrusion 2253*d* has a first thickness T1, and the elastic arch 2253*a* has a second thickness T2. The first thickness T1 is less than the second thickness T2. The first thickness T1 may be 0.3 times to 0.9 times the second thickness T2.

A seating groove 2264 into which the sealing protrusion 2253*d* is inserted may be formed in the transition piece flange 2261. If the sealing protrusion 2253*d* is inserted into the seating groove 2264, the liner 2250 and the transition piece 2260 may be prevented from being displaced from their original positions in a radial direction due to an external impact.

As described above, in accordance with the fourth embodiment, when the liner 2250 and the transition piece 2260 thermally expand, the sealing protrusion 2253*d* may be primarily elastically deformed to support the liner 2250 and the transition piece 2260, and the elastic arch 2253*a* may be secondarily elastically deformed to support them.

Hereinafter, a gas turbine in accordance with a fifth embodiment of the present disclosure will be described.

Figure 7:
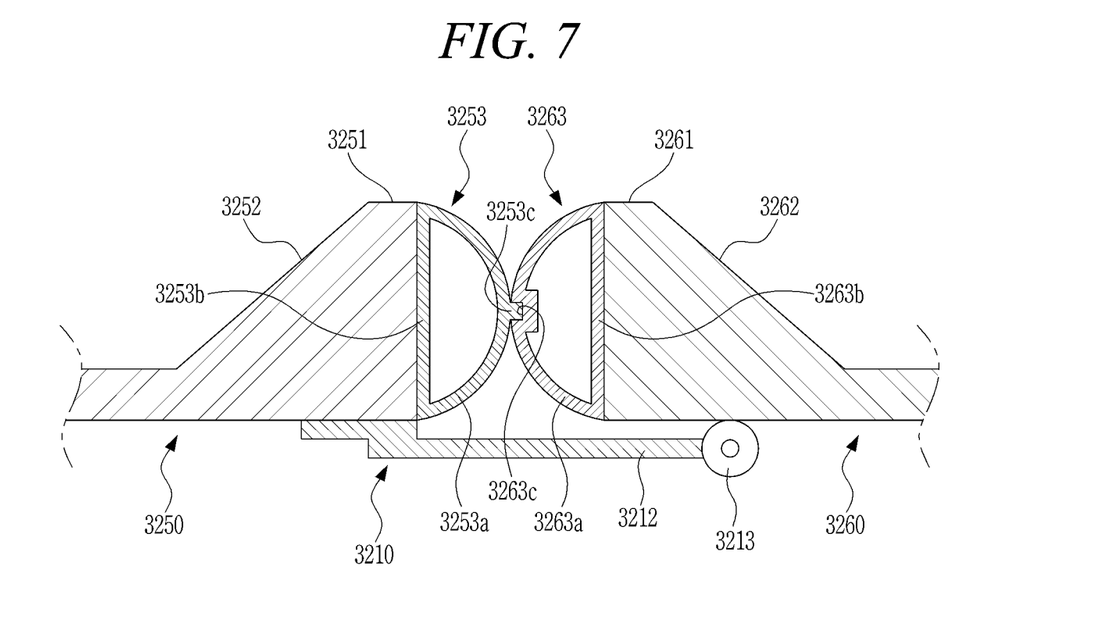

FIG. 7 illustrates a portion of a liner and a portion of a transition piece in accordance with a fifth embodiment of the present disclosure.

Referring to FIG. 7, the gas turbine in accordance with the fifth embodiment of the present disclosure has primarily the same structure as that of the gas turbine in accordance with the first embodiment described above and differs in the application of a first elastic support 3253, a second elastic support 3263, a liner 3250, a transition piece 3260, and a guide member 3210. Therefore, repetitive explanation of corresponding structure will be omitted.

The liner 3250 includes a liner flange 3251 protruding outward. The liner flange 3251 is formed on a longitudinal end of the liner 3250. The liner flange 3251 extends along a circumferential direction of the liner 3250 and thus has an annular shape. A facing surface of the liner flange 3251 that faces the transition piece 3260 may be formed in a direction perpendicular to an outer circumferential surface of the liner 3250. A flow guide surface 3252 of the liner flange 3251 that is oriented in a direction opposite to the facing surface may be formed to be inclined with respect to the outer circumferential surface of the liner 3250 so as to guide the flow of fluid moving along the outer circumferential surface of the liner 3250.

The transition piece 3260 includes a transition piece flange 3261 protruding outward. The transition piece flange 3261 is formed on a longitudinal end of the transition piece 3260. The transition piece flange 3261 extends along a circumferential direction of the transition piece 3260 and thus has an annular shape.

A facing surface of the transition piece flange 3261 that faces the liner 3250 may be formed in a direction perpendicular to an outer circumferential surface of the transition piece 3260. A flow guide surface 3262 of the transition piece flange 3261 that is oriented in a direction opposite to the facing surface may be formed to be inclined with respect to the outer circumferential surface of the transition piece 3260 so as to guide the flow of fluid moving along the outer circumferential surface of the transition piece 3260.

The first elastic support 3253 and the second elastic support 3263 are installed between the liner flange 3251 and the transition piece flange 3261 to elastically support the liner 3250 and the transition piece 3260.

The first elastic support 3253 may be fixed to the liner flange 3251 and formed of a leaf spring. Furthermore, the first elastic support 3253 may extend in the circumferential direction of the liner flange 3251 and thus have an annular shape.

When the liner 3250 and the transition piece 3260 thermally expand, the first elastic support 3253 is elastically deformed to support the liner 3250 and the transition piece 3260. For this, the first elastic support 3253 may include an elastic arch 3253*a* curved in an arc shape, a fixed part 3253*b* bent from opposite side edges of the elastic arch 3253*a*, and a sealing protrusion 3253*c* protruding from a central portion of the elastic arch 3253*a*.

The elastic arch 3253*a* may be formed of a curved surface, and the fixed part 3253*b* may be formed of a planar surface. The fixed part 3253*b* may be fixed to the liner flange 3251 by welding. The sealing protrusion 3253*c* may protrude from the elastic arch 3253*a* toward the transition piece flange 3261 and have a rectangular longitudinal cross-section.

The second elastic support 3263 may be fixed to the transition piece flange 3261 and formed of a leaf spring. Furthermore, the second elastic support 3263 may extend in the circumferential direction of the transition piece flange 3261 and thus have an annular shape.

When the liner 3250 and the transition piece 3260 thermally expand, the second elastic support 3263 is elastically deformed to support the liner 3250 and the transition piece 3260. For this, the second elastic support 3263 may include an elastic arch 3263*a* curved in an arc shape, a fixed base 3263*b* bent from opposite side edges of the elastic arch 3263*a*, and a support groove 3263*c* formed in a central portion of the elastic arch 3263*a*.

The elastic arch 3263*a* may be formed of a curved surface, and the fixed part 3263*b* may be formed of a planar surface. The fixed part 3263*b* may be fixed to the transition piece flange 3261 by welding. The sealing protrusion 3253*c* may be inserted into the support groove 3263*c*, whereby the first elastic support 3253 and the second elastic support 3263 may be coupled to each other in a fitting manner.

The guide member 3210 prevents the liner 3250 and the transition piece 3260 from being displaced from their original positions in a lateral direction and guides movement of the liner 3250 and the transition piece 3260 when thermally expanding.

The guide member 3210 comes into contact with an inner circumferential surface of the transition piece 3260 to support the transition piece 3260, and includes a guide rod 3212 fixed to an inner circumferential surface of the liner 3250, and a guide roller 3213 rotatably coupled to the guide rod 3212. The guide rod 3212 includes a first end fixed to the inner circumferential surface of the liner 3250, and a second end extending into an internal space of the transition piece 3260. The guide roller 3213 is coupled to the second end of the guide rod 3212 and is brought into contact with the inner circumferential surface of the transition piece 3260.

As described above, in accordance with the fifth embodiment, the first elastic support 3253 and the second elastic support 3263 are coupled to each other in a fitting manner, so that the liner 3250 and the transition piece 3260 may be prevented from being displaced from their original positions in a lateral direction. In addition, when the liner 3250 and the transition piece 3260 thermally expand, the guide rod 3212 guides movement of the liner 3250 and the transition piece 3260, whereby the liner 3250 and the transition piece 3260 may be stably supported without causing friction.

Hereinafter, a gas turbine in accordance with a sixth embodiment of the present disclosure will be described.

Figure 8:
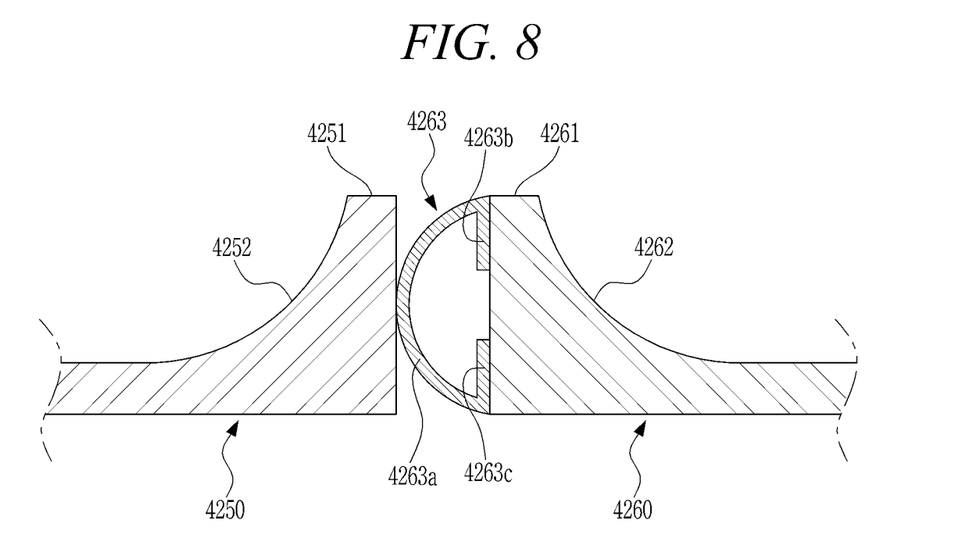

FIG. 8 illustrates a portion of a liner and a portion of a transition piece in accordance with the sixth embodiment of the present disclosure.

Referring to FIG. 8, the gas turbine in accordance with the sixth embodiment of the present disclosure has primarily the same structure as that of the gas turbine in accordance with the first embodiment described above and differs in the application of a second elastic support 4263, a liner 4250, and a transition piece 4260. Therefore, repetitive explanation of corresponding structure will be omitted.

The liner 4250 includes a liner flange 4251 protruding outward. The liner flange 4251 is formed on a longitudinal end of the liner 4250. The liner flange 4251 extends along a circumferential direction of the liner 4250 and thus has an annular shape. A facing surface of the liner flange 4251 that faces the transition piece 4260 may be formed in a direction perpendicular to an outer circumferential surface of the liner 4250. A flow guide surface 4252 of the liner flange 4251 that is oriented in a direction opposite to the facing surface may be concavely curved in an arc shape so as to guide the flow of fluid moving along the outer circumferential surface of the liner 4250.

The transition piece 4260 includes a transition piece flange 4261 protruding outward. The transition piece flange 4261 is formed on a longitudinal end of the transition piece 4260. The transition piece flange 4261 extends along a circumferential direction of the transition piece 4260 and thus has an annular shape.

A facing surface of the transition piece flange 4261 that faces the liner 4250 may be formed in a direction perpendicular to an outer circumferential surface of the transition piece 4260. A flow guide surface 4262 of the transition piece flange 4261 that is oriented in a direction opposite to the facing surface may be concavely curved in an arc shape so as to guide the flow of fluid moving along the outer circumferential surface of the transition piece 4260.

The second elastic support 4263 may be fixed to the transition piece flange 4261 and formed of a leaf spring. Furthermore, the second elastic support 4263 may extend in the circumferential direction of the transition piece flange 4261 and thus have an annular shape.

When the liner 4250 and the transition piece 4260 thermally expand, the second elastic support 4263 is elastically deformed to support the liner 4250 and the transition piece 4260. For this, the second elastic support 4263 may include an elastic arch 4263*a* curved in an arc shape, and fixed bases 4263*b* and 4263*c* which are bent from respective opposite side edges of the elastic arch 4263*a*.

The elastic arch 4263*a* may be formed of a curved surface, and each of the fixed bases 4263*b* and 4263*c* may be formed of a planar surface. Each of the fixed bases 4263*b* and 4263*c* may be fixed to the transition piece flange 4261 by welding.

As described above, in accordance with the sixth embodiment, the second elastic support 4263 may be elastically deformed, whereby the liner 4250 and the transition piece 4260 may be stably supported without causing friction due to sliding therebetween.

Figure 9:
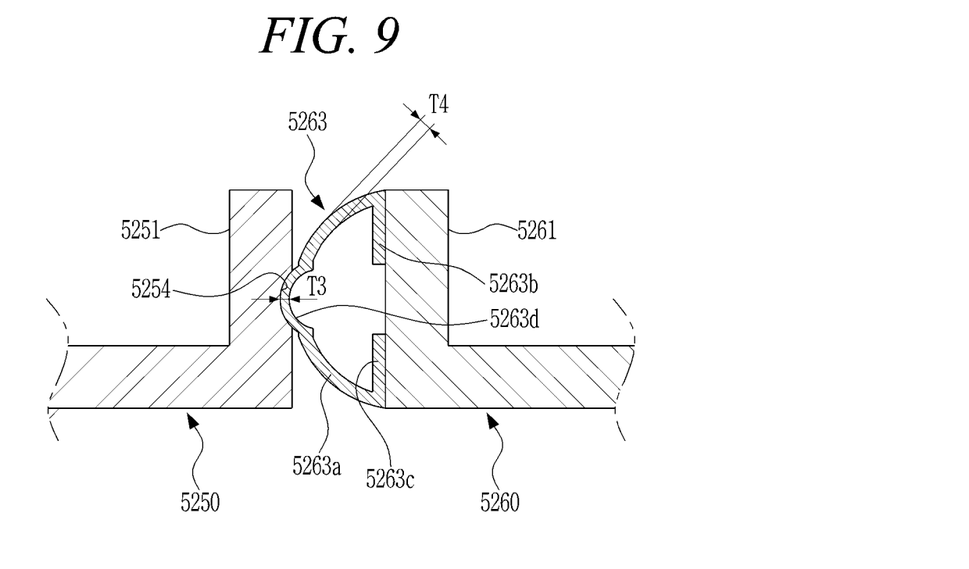

FIG. 9 illustrates a portion of a liner and a portion of a transition piece in accordance with a seventh embodiment of the present disclosure;

Referring to FIG. 9, the gas turbine in accordance with the seventh embodiment of the present disclosure has primarily the same structure as that of the gas turbine in accordance with the first embodiment described above and differs in the application of a second elastic support 5263. Therefore, repetitive explanation of corresponding structure will be omitted.

The second elastic support 5263 may be fixed to the transition piece flange 5261 and formed of a leaf spring. Furthermore, the second elastic support 5263 may extend in the circumferential direction of the transition piece flange 5261 and thus have an annular shape.

When the liner 5250 and the transition piece 5260 thermally expand, the second elastic support 5263 is elastically deformed to support the liner 5250 and the transition piece 5260. For this, the second elastic support 5263 may include an elastic arch 5263*a* curved in an arc shape, fixed bases 5263*b* and 5263*c* bent from respective opposite side edges of the elastic arch 5263*a*, and a sealing protrusion 5263*d* protruding from the elastic arch 5263*a*.

The elastic arch 5263*a* may be formed of a curved surface, and each of the fixed bases 5263*b* and 5263*c* may be formed of a planar surface. Each of the fixed bases 5263*b* and 5263*c* may be fixed to the transition piece flange 5261 by welding. The sealing protrusion 5263*d* protrudes from the elastic arch 5263*a* toward the transition piece flange 5261, and is curved in an arc shape and designed so as to be elastically deformable.

The sealing protrusion 5263*d* has a first thickness T3, and the elastic arch 5263*a* has a second thickness T4. The first thickness T3 is less than the second thickness T4. The first thickness T3 may be 0.3 times to 0.9 times the second thickness T4.

A seating groove 5254 into which the sealing protrusion 5263*d* is inserted may be formed in the liner flange 5251. If the sealing protrusion 5263*d* is inserted into the seating groove 5254, the liner 5250 and the transition piece 5260 may be prevented from being displaced from their original positions in a radial direction due to an external impact.

As described above, in accordance with the seventh embodiment, when the liner 5250 and the transition piece 5260 thermally expand, the sealing protrusion 5623*d* may be primarily elastically deformed to support the liner 5250 and the transition piece 5260, and the elastic arch 5263*a* may be secondarily elastically deformed to support them.

In a combustor and a gas turbine in accordance with the present disclosure, even if a liner and a transition piece thermally expands, the liner and the transition piece can be stably supported.

While the present disclosure has been described with respect to the specific embodiments, it will be apparent to those skilled in the art that various changes or modifications of the invention are possible by adding, changing, or deleting components without departing from the spirit and scope of the invention as defined in the following claims. It should be noted that these changes or modifications also fall within the bounds of the invention.

As such, although the present disclosure has been described with respect to the limited embodiments and drawings, the invention is not limited to these. Those skilled in the art may appreciate that various changes and modifications are possible within the scope defined by the technical spirit of the invention and other equivalents to the accompanying claims.

What is claimed is:

1. A combustor comprising:
a liner forming an internal space for combusting a mixture of fuel and compressed air ejected from a combustion nozzle, the liner extending in an axial direction of the combustor and including an outlet end configured to pass combustion gas and a liner flange protruding outward from the outlet end in a radial direction of the combustor;
a transition piece configured to be coupled with the liner and to discharge the combustion gas from the liner to a turbine, the transition piece extending in the axial direction and including an inlet end for coupling to the outlet end of the liner and a transition piece flange protruding outward from the inlet end in the radial direction, the transition piece flange including an axially facing surface facing an axially facing surface of the liner flange;
a first elastic support installed on the axially facing surface of the liner flange to protrude in the axial direction toward the axially facing surface of the transition piece flange;
a second elastic support installed on the axially facing surface of the transition piece to protrude in the axial direction toward the axially facing surface of the liner flange; and
a guide member configured to prevent the liner and the transition piece from being displaced from their original positions in a lateral direction when the liner and the transition piece are thermally expanding, the guide member including a guide rod fixed to an inner circumferential surface of the liner, and a guide roller rotatably coupled to the guide rod,
wherein the first elastic support and the second elastic support are coupled to each other by the first elastic support being fitted in the axial direction to the second elastic support, the first elastic support elastically deformed by contact with the second elastic support in order to support the transition piece coupled to the liner, the second elastic support elastically deformed by contact with the first elastic support in order to support the liner coupled with the transition piece;
wherein the liner flange includes a flow guide surface of the liner flange disposed upstream of the axially facing surface of the liner flange and a flow guide surface of the transition piece flange disposed downstream of the axially facing surface of the transition piece flange;
wherein the first elastic support and the second elastic support are D-shaped;
wherein the first elastic support comprises: a first elastic arch having a convexly curved outer surface facing the second elastic support, and a sealing protrusion protruding in the axial direction from the convexly curved outer surface of the first elastic support toward the second elastic support; and
wherein the second elastic support comprises: a second elastic arch having a convexly curved outer surface facing the first elastic support, and a support groove formed in the convexly curved outer surface of the second elastic support and configured to receive the sealing protrusion in the axial direction.

2. The combustor according to claim 1, wherein the guide rod includes a first end fixed to the inner circumferential surface of the liner, and a second end extending into an internal space of the transition piece; and
wherein the guide roller is coupled to the second end of the guide rod and is brought into contact with an inner circumferential surface of the transition piece.

3. The combustor according to claim 1, wherein the flow guide surface of the liner flange and the flow guide surface of the transition piece flange start at the most radially outer point of the liner flange and transition piece flange, respectively, and are declined toward the liner and the transition piece, respectively, in a direction away from their respective axially facing surfaces.

4. The combustor according to claim 1, wherein the sealing protrusion of the first elastic support includes a flat surface facing the support groove of the second elastic support, the flat surface of the sealing protrusion extending in the radial direction;
wherein the support groove of the second elastic support includes a flat surface for receiving the flat surface of the sealing protrusion, the flat surface of the support groove extending in the radial direction; and
wherein the flat surface or the support groove has a radial length substantially equal to a radial length of the flat surface of the sealing protrusion.

5. A gas turbine comprising:
a compressor configured to compress air drawn from an outside;
a combustor configured to mix fuel with the compressed air and to produce combustion gas by combusting the fuel-air mixture; and
a turbine configured to be rotated by the combustion gas, wherein the combustor comprises:
a liner forming an internal space for combusting a mixture of fuel and compressed air ejected from a combustion nozzle, the liner extending in an axial direction of the combustor and including an outlet end configured to pass combustion gas and a liner flange protruding outward from the outlet end in a radial direction of the combustor;
a transition piece configured to be coupled with the liner and to discharge the combustion gas from the liner to a turbine, the transition piece extending in the axial direction and including an inlet end for coupling to the outlet end of the liner and a transition piece flange protruding outward from the inlet end in the radial direction, the transition piece flange including an axially facing surface facing an axially facing surface of the liner flange;
a first elastic support installed on the axially facing surface of the liner flange to protrude in the axial direction toward the axially facing surface of the transition piece flange;
a second elastic support installed on the axially facing surface of the transition piece to protrude in the axial direction toward the axially facing surface of the liner flange; and
a guide member configured to prevent the liner and the transition piece from being displaced from their original positions in a lateral direction when the liner and the transition piece are thermally expanding, the guide member including a guide rod fixed to an inner circumferential surface of the liner, and a guide roller rotatably coupled to the guide rod,
wherein the first elastic support and the second elastic support are coupled to each other by the first elastic support being fitted in the axial direction to the second elastic support, the first elastic support elastically deformed by contact with the second elastic support in order to support the transition piece coupled to the liner, the second elastic support elastically deformed by contact with the first elastic support in order to support the liner coupled with the transition piece;
wherein the liner flange includes a flow guide surface of the liner flange disposed upstream of the axially facing surface of the liner flange and a flow guide surface of the transition piece flange disposed downstream of the axially facing surface of the transition piece flange;
wherein the first elastic support and the second elastic support are D-shaped;
wherein the first elastic support comprises: a first elastic arch having a convexly curved outer surface facing the second elastic support, and a sealing protrusion protruding in the axial direction from the convexly curved outer surface of the first elastic support toward the second elastic support; and
wherein the second elastic support comprises: a second elastic arch having a convexly curved outer surface facing the first elastic support, and a support groove formed in the convexly curved outer surface of the second elastic support and configured to receive the sealing protrusion in the axial direction.

6. The gas turbine according to claim 5, wherein the guide rod includes a first end fixed to the inner circumferential surface of the liner, and a second end extending into an internal space of the transition piece; and
wherein the guide roller is coupled to the second end of the guide rod and is brought into contact with an inner circumferential surface of the transition piece.

7. The gas turbine according to claim 5, wherein the flow guide surface of the liner flange and the flow guide surface of the transition piece flange start at the most radially outer point of the liner flange and transition piece flange, respectively, and are declined toward the liner and the transition piece, respectively, in a direction away from their respective axially facing surfaces.

8. The gas turbine according to claim 5, wherein the sealing protrusion of the first elastic support includes a flat surface facing the support groove of the second elastic support, the flat surface of the sealing protrusion extending in the radial direction;
wherein the support groove of the second elastic support includes a flat surface for receiving the flat surface of the sealing protrusion, the flat surface of the support groove extending in the radial direction; and
wherein the flat surface or the support groove has a radial length substantially equal to a radial length of the flat surface of the sealing protrusion.

* * * * *